United States Patent [19]

Buljan

[11] 4,101,616

[45] Jul. 18, 1978

[54] PROCESS FOR PRODUCING $Si_3N_4$ ARTICLE

[75] Inventor: Sergei-Tomislav Buljan, Towanda, Pa.

[73] Assignee: GTE Sylvania Incorporated, Stamford, Conn.

[21] Appl. No.: 780,516

[22] Filed: Mar. 23, 1977

Related U.S. Application Data

[63] Continuation-in-part of Ser. No. 627,362, Oct. 30, 1975, abandoned.

[51] Int. Cl.$^2$ ............................................. C01B 21/06
[52] U.S. Cl. ............................. 264/65; 264/DIG. 19; 106/73.5; 423/344
[58] Field of Search ................. 423/344, 409; 264/65, 264/345, 63, DIG. 19; 106/55, 73.5

[56] References Cited

U.S. PATENT DOCUMENTS

| B 581,564 | 3/1976 | Jacobson | 106/73.5 |
| 3,084,998 | 4/1963 | Dess | 423/344 |
| 3,399,979 | 9/1968 | Hamling | 423/344 X |

OTHER PUBLICATIONS

Mazdiyasni et al., "J. Am. Ceram. Soc. 56", pp. 628–633, 1973.

Primary Examiner—Jack Cooper
Attorney, Agent, or Firm—John C. Fox

[57] ABSTRACT $Si_3N_4$ fibrous articles are produced by forming a low density compact of amorphous $Si_3N_4$ powder and heat treating the compact to promote in-situ formation of fibrous crystalline alpha $Si_3N_4$. Such articles are useful as thermal insulants, packing materials, resilient seals, etc.

2 Claims, No Drawings

PROCESS FOR PRODUCING Si₃N₄ ARTICLE

CROSS-REFERENCE TO RELATED APPLICATION

This case is a continuation-in-part of Ser. No. 627,362, filed Oct. 30, 1975, now abandoned and assigned to the assignee of the present invention, said assignment recorded Oct. 30, 1975, Reel 3248 Frame 232.

BACKGROUND OF THE INVENTION

This invention relates to a process for producing fibrous $Si_3N_4$ articles of manufacture and to the resultant articles.

Fibrous $Si_3N_4$ produced by a special high temperature reaction process in batch furnaces is recognized to have potential as a high temperature insulant. "Materials for Engineers", edited by W. L. Parr, *The Engineer*, July 1, 1966, p. 19. The process involves the high temperature reaction between fine silicon droplets and nitrogen on the tips of growing single crystal whiskers, and thus tends to be expensive and time consuming. Furthermore, the individual whiskers produced are difficult to handle and to form into self-supporting articles, particularly of complex shape.

SUMMARY OF THE INVENTION

Self-supporting fibrous $Si_3N_4$ articles, which may be of complex shape and controlled density, are produced by first forming a low density green body of amorphous $Si_3N_4$ powder, followed by heat treating the body to promote formation in situ of fibrous crystalline alpha $Si_3N_4$. The green body may be formed, for example by pressing, casting, extruding, etc. The final articles are useful in a variety of high temperature applications, such as thermal insulants, packing materials, resilient seals, etc.

Heat treatment may be carried out, in accordance with a preferred embodiment, at a temperature within the range of about 1550° C to 1750° C for from about 0.25 to 5 hours in a non-oxidizing atmosphere such as nitrogen or hydrogen.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

The $Si_3N_4$ starting material must be substantially amorphous particles in order that subsequent heat treatment may result in conversion of the particles directly to elongated needle-shaped crystals of alpha $Si_3N_4$ or "fibers", herein defined as having a length to width ratio of at least 100:1. The term "amorphous" refers to a short range order solid material as indicated by its lack of x-ray diffraction intensity peaks and by broad infrared absorption peaks.

The amorphous silicon nitride starting material may be obtained, for example, by the vapor phase reaction between $SiCl_4$ and $NH_3$. A preferred technique is described and claimed in copending patent application Ser. No. 436,432, filed Jan. 25, 1974, assigned to the assignee hereof and abandoned Nov. 17, 1975. However, to aid the practitioner a brief summary of that technique is as follows: The reactants, $SiCl_4$ and $NH_3$ of the desired purity (at least 99.9 percent) are introduced into the reaction apparatus at a point where the temperature is at least 1000° C. The temperature of the reaction zone should be maintained between 1100° C and 1350° C.

A suitable diluent gas, provided it is of the requisite purity and is non-reactive, may be present in the reaction chamber. The gas pressure in the reaction zone should be at least atmospheric in order for the product to be produced in particulate form. Typical diluent gases include nitrogen, argon and helium. Since the finely divided product is susceptible to oxidation, the diluent gas or other inert atmosphere or vacuum should be maintained in contact with the product until it is cooled to below at least 100° C.

The mole ratio of $NH_3$ to $SiCl_4$ should preferably be maintained within the range of 1.25 to 15.

The $NH_4Cl$ by-product may be removed from the product in a separate step by heating in a non-oxidizing atmosphere or vacuum above about 340° C, the sublimation temperature of $NH_4Cl$.

Some oxygen, typically less than about 4 weight percent of the product may also be absorbed on the powder, and may be reduced to less than about 1 percent by heating the powder in dry nitrogen or other non-reactive atmosphere.

The amorphous powder can be formed into a green compact by dry pressing or pressing with organic binders or other fugitive forming aids which burn off at relatively low temperatures, or by extruding, casting, or other techniques known in the ceramic art. The bulk density is maintained relatively low in order to provide space for the "fibers" to grow and interlock to form a porous resilient structure. The bulk density of the green compact should thus be within the range of $0.10 g/cm^3$ to $0.80 g/cm^3$, below which mechanical strength of the heat treated body may be insufficient to maintain its integrity during handling, and above which there is insufficient space for the fibers to grow and develop the interlocked structure. Bulk density may be controlled by dry or wet ball milling of starting amorphous powder and adjusting parameters such as powder particle size, binder amount, press weight, etc., as is well known in the art.

The formed body of amorphous $Si_3N_4$ is then heat treated, preferably in a non-oxidizing atmosphere such as $H_2$ or $N_2$, for a time and temperature sufficient to permit the growth of a substantial amount of fibers. As stated above, these elongated fibers tend to become interlocked to give the body a fibrous texture and necessary mechanical strength. Preferred heat treatment conditions are at a temperature within the range of about 1550° C to 1750° C for about 0.25 to 5 hours.

Resultant fibrous articles of $Si_3N_4$ have sufficient mechanical strength to enable handling, shipping, etc., yet sufficient resiliency to enable use as thermal insulants, packing materials, resilient seals, etc. Such articles formed from green bodies having bulk densities within the above range and heat treated within the above range will generally exhibit final densities in the range of about $0.15 g/cm^3$ to $0.95 g/cm^3$ and thermal conductivities within the range of about 0.5 to 3.0 BTU inches per square foot.

By way of example, fiber mats prepared by dry pressing of amorphous silicon nitride powder at 500 psi to give a bulk density of $0.15 g/cm^3$ and heat treated at 1550° C for 1 hour in a hydrogen atmosphere exhibit a final density of 0.2 g/cm³ and a calculated thermal conductivity of 0.6 BTU in./ft.² h°F between 400° and 2400° F. The characteristic brittleness of dense ceramics such as $Si_3N_4$ negatives any degree of resiliency, even under extreme loads. A dense body under compressive load would fail mechanically before deformation. The inventive body is notable in that it is resilient despite the fact that it is largely $Si_3N_4$. This resiliency arises from the structure of interlocking fibers, which individual fibers can move under compressive load to accommodate deformation without failure.

While there has been shown and described what are at present considered the preferred embodiments of the invention, it will be obvious to those skilled in the art that various changes and modifications may be made therein without departing from the scope of the invention as defined by the appended claims.

What is claimed is:

1. Process for producing self-supporting fibrous articles consisting essentially of alpha $Si_3N_4$ comprising:
   (a) forming a green body of low bulk density within the range of about 0.1 g/cm³ to 0.8 g/cm³ of substantially amorphous $Si_3N_4$ powder, and
   (b) heat treating the body at a temperature within the range of about 1550° C to 1750° C for from about 0.25 to 5 hours in a non-oxidizing atmosphere to promote in situ formation of fibrous crystalline alpha $Si_3N_4$ from the amorphous $Si_3N_4$ particles.

2. Process of claim 1 in which the green body is formed by pressing the powder to a green compact.

* * * * *